(12) United States Patent
Deterling (10) Patent No.: US 6,381,861 B1
(45) Date of Patent: May 7, 2002

(54) EFFECTIVE DIAMETER SYSTEM

(76) Inventor: Gary W. Deterling, 3610 Acorn Wood Way, Houston, TX (US) 77059

( * ) Notice: Subject to any disclaimer, the term of this patent is extended or adjusted under 35 U.S.C. 154(b) by 0 days.

(21) Appl. No.: 09/378,627

(22) Filed: Aug. 20, 1999

(51) Int. Cl.[7] .................................................. G01B 5/08
(52) U.S. Cl. .................... 33/555.1; 33/199 R; 33/501.7; 33/542
(58) Field of Search ........................... 33/199 R, 199 B, 33/501.7, 501.11, 501.12, 501.13, 530, 542, 543, 544.4, 544.5, 544.6, 549, 550, 555.1

(56) References Cited

U.S. PATENT DOCUMENTS

| | | | | |
|---|---|---|---|---|
| 2,501,130 A | * | 3/1950 | Kuppersmith | 33/199 R |
| 2,566,356 A | * | 9/1951 | Niper | 33/199 R |
| 2,637,116 A | * | 5/1953 | Wiebe | 33/542 |
| 3,296,705 A | * | 1/1967 | Johnson | 33/199 R |
| 4,567,670 A | * | 2/1986 | Roulstone | 33/199 R |
| 4,947,555 A | * | 8/1990 | Allen, III | 33/199 R |
| 4,965,937 A | * | 10/1990 | Hill | 33/199 R |
| 4,974,327 A | * | 12/1990 | Greenslade | 33/783 |
| 5,276,971 A | * | 1/1994 | Brewster | 33/199 R |
| 5,711,083 A | * | 1/1998 | Bidwell | 33/783 |
| 6,145,207 A | * | 11/2000 | Brunson | 33/784 |

* cited by examiner

Primary Examiner—Andrew H. Hirshfeld
(74) Attorney, Agent, or Firm—Wendy Buskop (57) ABSTRACT

The present invention relates to a system for measuring a part, and an apparatus for measuring which is a dimensional gage for measuring inside and outside surfaces of an object, that comprises (1) a gage base; (2) at least three removable spindles attached to the gage base; (3) a moveable roll assembly attached to the gage base further comprising at least one guide rod, at least one spindle guide block, at least one linear bearing, at last one spring, and at least one guide rail block; (4) a plurality of measuring means attached to each of said removable spindles and spaced equidistantly around a central axis with each of the measuring means being spaced equidistantly from the other measuring means around the central axis, and wherein at least one of the measuring means is removable attached to the moveable roll assembly; (5) a lever for adjusting the movable roll assembly to engage the measuring means removably attached to the moveable roll assembly with a test part; (6) a housing attached to the gage base; and (7) an indicator disposed inside the housing and attached to the gage base for indicating the measurement of a test object which can include: pitch, lead or taper or combinations thereof.

22 Claims, 9 Drawing Sheets

EFFECTIVE DIAMETER SYSTEM

BACKGROUND OF THE INVENTION

The present invention relates to a gage and system for both internally and externally measuring tapered threads or tapered parts of a device to insure a precision shape. This gage utilizes three tapered cylindrical or grooved rolls, known as the tapered grooved rolls. Additionally, smooth tapered rolls or pin noses can be disposed around an axis at 120 degrees to form an inscribed circle. These measuring devices are of ground cylindrical or grooved shape with the form of the API or premium product that is to be measured. Two rolls or pin noses are secured to the body of the gage and a third is movable which enables the gage to be attached to the part to be measured.

The present invention is used in the manufacturing or inspection process for measuring inside and outside effective function fit of pitch diameters for tapered threaded tubing and casing connections. This invention is a significant improvement over known gages not only because it can measure both inside and outside parts, but because it can utilize interchangeable measuring means, a pin nose and two different types of tapered rolls to be more convenient than any other system.

In the oil and gas production industry, many downhole products, such as drill pipe, hangers, tubing, casing and premium tubing and casing products, line pipe, sucker rod and all other API connections threaded on the ends to connect each other together. Many of these threads are tapered.

Threaded taper connections must be precise in their constructions to be leak free, tough, strong, fatigue resistance and durable.

The American Petroleum Institute (API) has a specification for threading, gauging and thread inspection of components used in the oil and gas productions industry. This requires manufactures to have a complete set of hardened and ground steel ring and plug working gages. By design, a gage must be purchased for each internal and external connection. There are currently 70–100 API sizes that must be purchased. Hardened and ground working ring and plug gages are heavy and cumbersome as well as expensive to purchase. These ring and plug gages are designed to be threaded onto connections and after repeated use, wearout.

This specification sets forth a gage for measuring pitch for the different types and sizes of tubing and casing connections. Within this gage, stated pitch diameter distances from the end of the threaded connection to the point of the tapered threads can be measured.

The expense for Premium Threading Supply Companies readily becomes apparent when the limited and propriety nature of these special thread forms is factored into the cost to manufacture. These thread forms are of a much higher precision and tighter tolerance and higher cost than normal forms. Accordingly, these gages also can wear at higher rates than standard API thread forms, because of the highly abrasive materials that premium threads are experience. The number of special or premium gages reaches into many hundreds or sizes and thread forms.

Whereas, these premium manufactures, must maintain a large inventory of gages of various thread forms and diameters, also the initial purchase price and cost of maintaining these gages and for the shipping of these gages to many on-site locations. It becomes a necessity to use a functional, adjustable, affordable, reliable and portable gage system.

This Effective Diameter System offers the advantages of low initial cost, adaptable to many internal and external diameters. Can be used to measure many thread pitches for tubing, casings and drill pipe taper threaded connections, has low maintenance cost and is very portable.

Others have attempted to provide indicating gages using two-point contacts for taper threaded products. These alternative gages are deficient in that they are a crest form and not true pitch diameter gages. If the thread height of the thread form cut into this connection is on the low or high side of tolerance, a true indicated reading of pitch diameter is not forthcoming.

The indicated readings of these gages do not fall within a GR&R study with any high correlation of repeatability for any given connection.

Thus, it has long been a desire of manufactures and inspection companies to have a gage give an accurate indicated reading of a threaded connection's effective pitch diameter acceptance.

Various patents have covered gages for measuring only the inside or outside of a test part, or only one measurement, such as taper of a test part have been used. Applicant notes, for example, U.S. Pat. No. 2,730,808 for a gage for an externally tapered test part has a circular cross section comprising a frame, taper gaging means carried by the frame, the taper gaging means having a smaller diameter which corresponds to the smaller dimension of the test part and a larger diameter end corresponding to the larger dimension of the test part, and a taper gaging means having a laterally extending slot into the gaging means, and limit means mounted upon the gage for movement through the slot into the taper gaging means.

U.S. Pat. No. 2,725,637 which is an attachment to a gage. It is a concentricity attachment for a gage comprising a rigid support, a lever mounted on the support intermediate the ends of the lever for pivotal movement and for axial movement, with a groove in the lever and a screw carried by the support engaging in the groove. Further, this gage attachment includes spring means to push the lever axially, means at one end of the lever for engaging that portion of the test part whose concentricity is to be determined, and an indicator engaging the lever adjacent its other end to indicate the pivotal movement of the lever.

U.S. Pat. No. 2,849,804 has a gage which has no mention of utility for pin nose measurement. Specifically, it claims a gage comprising a frame, a plurality of studs mounted upon the frame in spaced relation, means mounting at least one stud on the frame for movement towards and from another stud, a gaging roll rotatably mounted on each stud and having a center axis, at least one circumferential thread gaging ridge upon the periphery of each roll, and a flat setting surface carried by each gaging roll at a distance from the center axis of the gaging roll the same as the radius of the pitch diameter of the thread gaging ridge, wherein each flat setting surface extends at right angles to a line through the center axis of the gaging roll.

U.S. Pat. No. 3,217,419 is directed to a screw thread indicator gage, which does not have the ability to measure non-thread indicators. Specifically, this invention is a screw thread indicator gage comprising a pair of stationary gaging rolls and another gaging roll movable toward and away from the stationary rolls, an indicator responsive to movement of said movable roll from a basic setting, a probe disposed in a plane perpendicular to a line extending from the center to the center of the stationary rolls. This probe is movable in response to the algebraic sum of the extent of movement of the first movable roll and the deviation of a thread element from a basic setting. The invention does involves computing means responsive to movement of said movable roll and said probe for computing the deviation of said thread element. It is unlike the present invention.

U.S. Pat. No. 3,609,870, is directed to a radially movable gaging means. This invention is a gage having radially movable gaging means comprising a slide and a carrier secured thereto with the carrier carrying a gaging element. A projection or radial abutting means is carried by the slide or carrier and engages the other for positive radial retention of the carrier with respect to the slide. The projection or radial abutting may be adjustable. Lateral retention means is also provided between the slide and carrier. For gaging means with an arcuate gaging element, one or more additional means are provided for adjusting each gaging means in a lateral direction to bring the arcuate gaging element into arcuate alignment and in a planar direction for an accurate planar relationship between gaging elements. This device requires the use of two spring means for engaging the device to be measured, and has a different construction for the moveable assembly as compared to the present invention.

U.S. Pat. No. 5,182,862, is for a thread gage to measure tapered threads comprising an active block slidably engaged to a guide rail. A biasing means for biasing the active block to a neutral position is also provided. A fixed block is also engaged to the guide rail passing therethrough. An indicator for transducing movement of the active block along the guide rail is part of the invention with a further active arm with one end secrued to the active block. This block means is unlike the present invention.

U.S. Pat. No. 4,524,524, describes a system of measuring the inside or outside pitch diameter of a straight or tapered threaded product at a selected distance from the end of the product by setting a predetermined horizontal distance between an upper pivotable flat thread contact surface and a vertical bearing surface and between a lower pivotable flat thread contact surface and the vertical bearing surface. The horizontal distance being measured is in a vertical plane which is perpendicular to the bearing surface.

SUMMARY OF THE INVENTION

The present invention is a dimensional system for measuring inside and outside surfaces of an object. It comprises a gage base, which is preferably a flat plate, and at least three removable spindles attached to the gage base. Further, a moveable roll assembly is attached to the gage base. The invention further comprises at least one guide rod, at least one spindle guide block, and at least one linear bearing. The invention further includes at least one spring, at least one guide rail block, a plurality of measuring means attached to each of said removable spindles and spaced equidistantly around a central axis with each measuring means being spaced equidistantly from the other measuring means around the central axis. The measuring means are each removably attached to the moveable roll assembly. A lever is included in the invention for adjusting the movable roll assembly. The lever can compress the spring on said moveable roll assembly, allowing the gage's measuring parts, which can be a threaded tapered roll, a smooth tapered roll or a pin nose, to engage with a test part. A housing is attached to the gage base protecting an indicator which is also attached to the gage base is used for indicating one or more measurements of a test object, such as pitch, lead, taper or combinations of these measurements, known as Effective Pitch Diameter.

DETAILED DESCRIPTION

Figure 1:
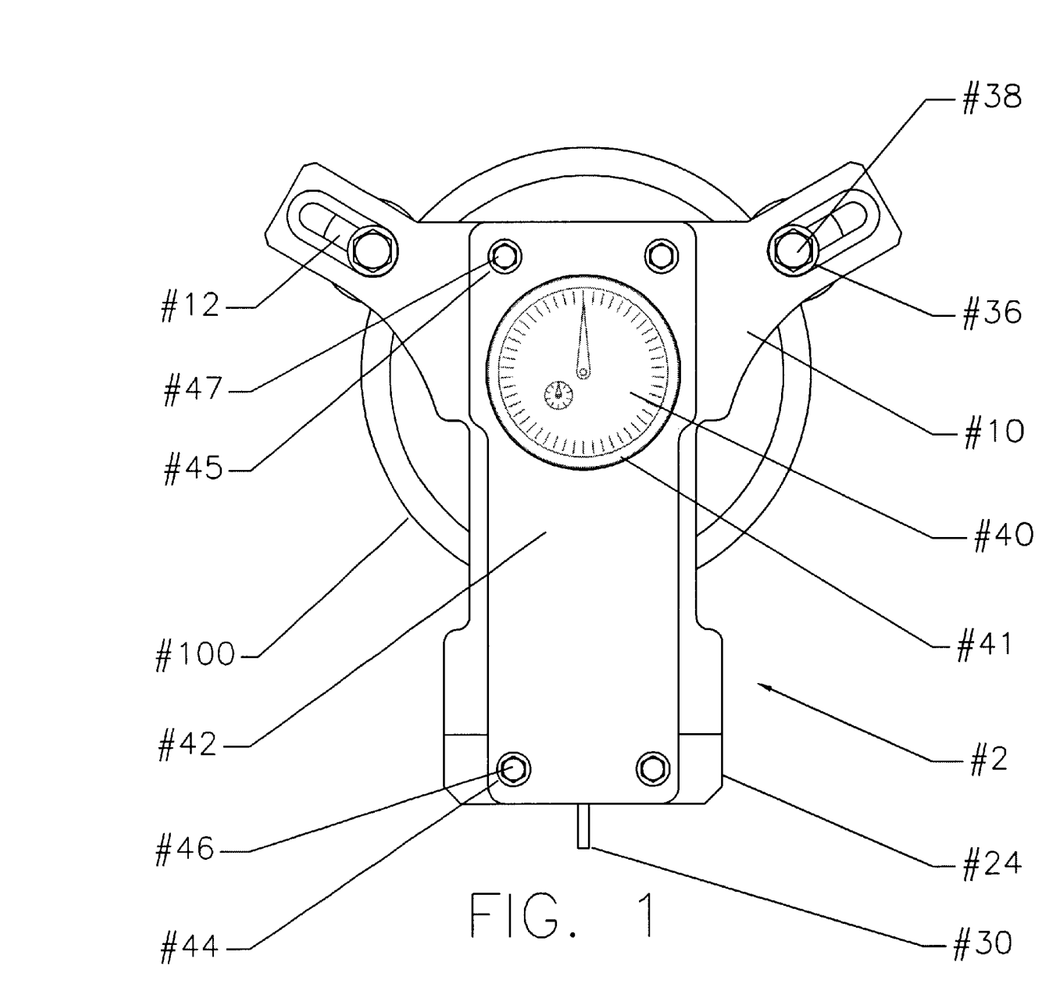
FIG. 1 is a top view of the gage.

The present invention as shown in FIG. 1 relates to a gage 2 for measuring dimensions, namely the inside and outside surfaces of an object 100 or the surfaces of a standard such as a reference master. The gage is constructed from a gage base support 10 which is preferably a plate construction and has a basic three-arm construction.

The gage 2 is preferably made from aluminum, but other kinds of metals could be used as well. It is contemplated that brass, chrome plated metal, steel, high tensile strength tool steel, titanium composites, fiberglass, polymers having hard crystalline molecular structures, stainless steel and metals structures capable of sustaining severe impact and laminates or combinations thereof could be usable within the scope of the present invention.

Gage 2 has a gage base support 10 with three arm construction, on this base 10 are at least three, removable spindles 200, 202 and 204 attached to the gage base support 10 with removable spindle washers 36 and 36a and removable spindle nut 38 and 38a as shown in FIG. 1. The spindles can be manufactured from the same materials as the gage base support 10. The spindles can be a one piece unit, or a two or three piece unit which can be assembled.

Figure 2:
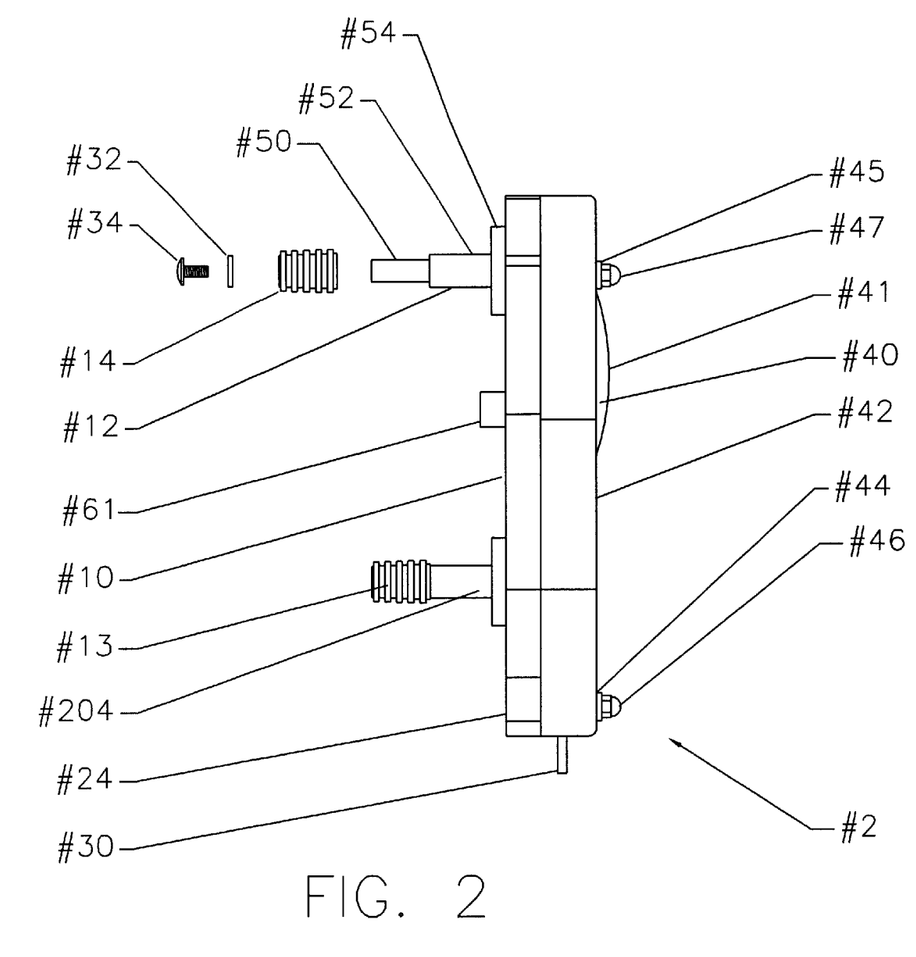
FIG. 2 is a side view of the gage.
Figure 3:
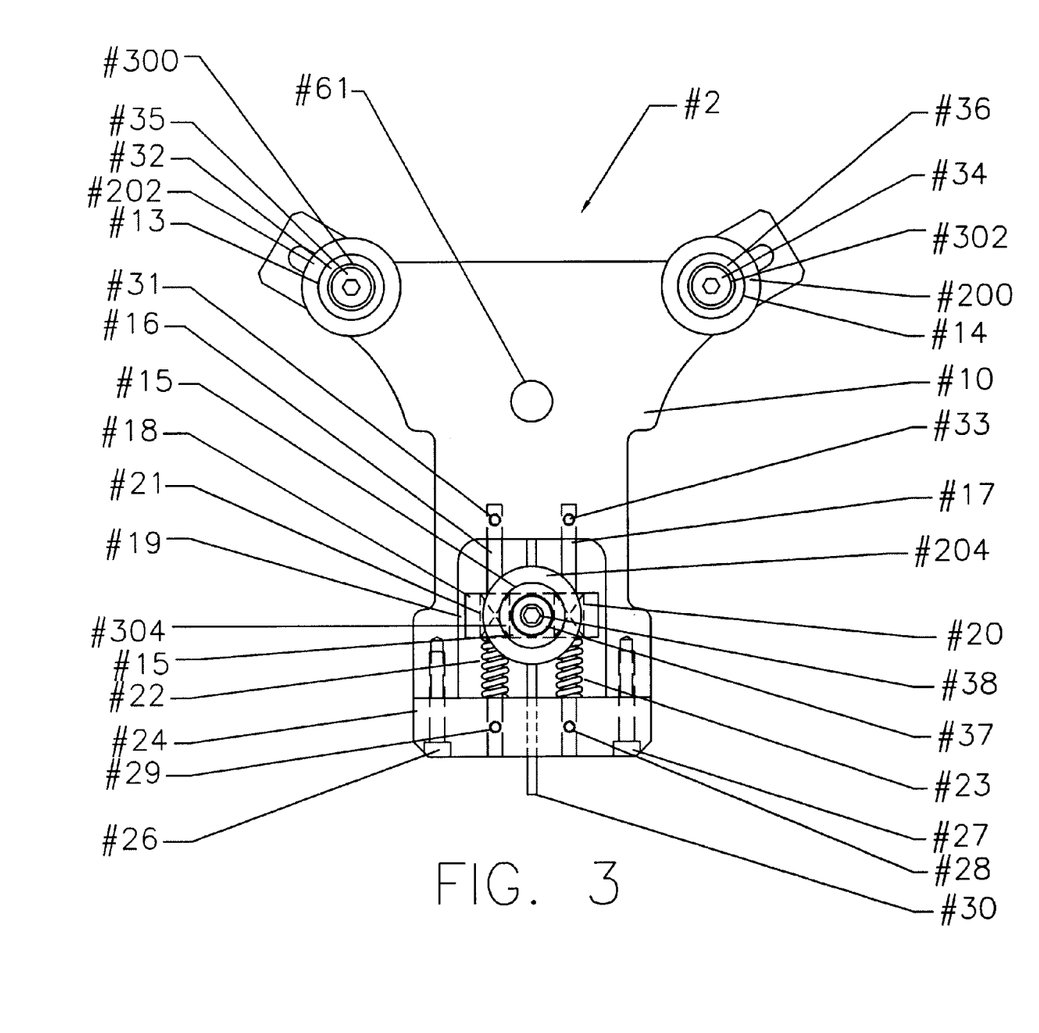
FIG. 3 is a bottom view of the gage.

FIG. 2 is a side view of the gage 2 with spindle 200. As shown in FIG. 2 spindle 200 has a construction consisting of segments 50 and 52 and reference surface 54. Segment 50 is the portion of the spindle 200 on which measuring means, such as a roll 14, attaches. Segment 52 is the portion of the spindle 200 that is precision measured to maintain roll 14 at a specific defined distance from reference surface 54. Reference surface 54 is a critical surface for measuring the physical properties of part 100. FIG. 3 shows a precision pin 61 which acts as a set point for calibrating the gage 2. As a set point, the part to be measured 100 is centered on the precision pin 61, prior to measuring using spindle 200. Additionally, FIG. 2 also shows a housing 42 attached to the gage base 10 using housing washers 44, 45 and housing acorn nuts 46 and 47.

An indicator 40 is disposed inside the housing 42 attached to the gage base 10 for indicating measurement of a test object. With this unique configuration of parts, this gage 2 is capable of measuring pitch, lead and taper and the combination of these measurements is known as "Effective Pitch Diameter."

The indicator 40 is preferably an analog indicator as shown in FIG. 1, but it is contemplated that a digital indicator, an electronic probe, a differential measuring instrument, an infrared transmitted gage or a Data Collection/Logging System could be used within the scope of the present invention as a measurement indicator.

A typical indicator 40 that could be used on this gage 2 is a ½" travel and 1" travel Analog or Digital. There are also several manufacturers of SPC or Data Logging and Collection Systems. The following is a list of these manufacturers and many more could be included in this list, to supply an appropriate indicator.

Ames
Boice
Brown & Sharpe
Chicago Dial Indicator
Do-All
Dyer
Etalon
Flexibar
Federal Products
Fowler
Gem
Gagemaker
Gagemaster
Helios
Interapid
Mahr
Master Gage
Mitutoyo
Mueller
Peacock
Phase II
ST Industries
SPI
Sony Precision
Starrett FIG. 2 additionally shows that the housing 42 is preferably attached to the gage base 10 with a housing washer 44 and a housing acorn nut 46. The threaded roll is shown to be attached with roll capture washers 32 and roll capture screws 34. It is contemplated that it is within the scope of the present invention a cover 41 is provided over the face of the indicator 40. The lens cover 41 can be used to enhance the viewing of the measurements of the indicator or act as a protective device, a sturdy cover which aids in keeping the indicator free of grit, grime, and attack by weather.

FIG. 3 shows a bottom view of the gage 2 and it includes at least one guide rod 16, although two are shown 16 and 17 in the embodiment of FIG. 3. Further, a moveable roll assembly 19 is shown which includes at least one spindle guide block 18, at least one linear bearing 20, at least one spring 22, although in the embodiment of FIG. 3, two springs, 22 and 23 are shown. Spring 22 is located on at least one guide rod block 24. A second spring 23 would be located in the same guide rod block 24. Also, at least two linear bearings are used in the preferred embodiment, linear bearing 20 and linear bearing 21 are shown in the drawing.

FIG. 3 shows three rolls 13, 14, and 15 on spindles 200, 202, and 204 respectively. It is contemplated that the roll 15 has a preloaded tension of between one (1) ft/lb and 100 ft/lb and that the tension is applied equally against all surfaces of the part to be measured.

In a preferred embodiment, the guide rod s 16 and 17 are made from high tensile strength tool steel, but other materials could be used as well. Brass, chrome plated metal, high impact crystalline polymer, steel, stainless steel, titanium and laminates of all these materials are contemplated as within the scope of the present invention.

The guide rod block 24 is attached using guide block bolts 26 and 27, and set screws 28, 29, 31, and 33 are used for mounting the movable assembly to the gage base 10 as shown in FIG. 3.

The present invention uses a plurality of measuring means one embodiment is the previously noted pin nose measuring means, the second and third embodiments use either tapered rolls or grooved tapered rolls. Rolls 13, 14, and 15, are attached to each of the removable spindles 200, 202, and 204. These removable spindles 200, 202, and 204 have the measuring means, (such as the grooved tapered rolls) 13,14, and 15 spaced equidistantly around a central axis with each roll being spaced equidistantly from each other around the central axis.

In the most preferred embodiment, it is contemplated that the measuring means are spaced around an axis at 120 degrees to form an equilateral triangle.

Rolls 13, 14, and 15 are held onto the spindles 200, 202, and 204 using roll capture washers 300, 302 and 304 and roll capture screws 34, 35, and 37 which is shown in detail in FIGS. 1 and 3.

The precision pin 61 is located as a set point in the center of the gage 2 in all preferred embodiments.

When grooved tapered rolls 13, 14 and 15 are used on the gage 2, each grooved tapered roll is preferably located in a different plane relative to each other grooved tapered rolls, and each grooved tapered roll is in a stepped relationship to the product or object 100.

Additionally, the preferred stepped relationship between the grooved tapered rolls 13, 14, and 15 is between 0.001 inch and 0.500 inches.

When grooved tapered rolls are used on the gage 2, it is preferred that each has a precision ground lead of between 1 pitch and 100 pitch, a height of between 0.001 inch and 0.500 inch and a taper ranging from between ½ inch taper and 5.00 inch taper per foot.

When smooth tapered rolls are used on gage 2, it is preferred that they each have a precision ground taper ranging from between 0.500 inch taper per foot and 5.00 inch taper per foot.

In another embodiment, it is contemplated that all the smooth tapered rolls are located in the same plane relative to each other.

When a pin nose is used on the gage 2 as the measuring means, all pin noses are located in the same plane relative to each other. When the pin nose is used on gage 2 of the present invention, it is preferred that each pin nose have a precision ground ball contact of between 1 pitch and 100 pitch, and a stand off position for the precision ground ball contact of between 0.010 inch to 10 inches. In the preferred embodiment, one pin nose is the measuring pin nose and the other two pin noses are fixedly adjustable pin noses.

Further, when a pin nose is used, it is preferred that the precision ground ball contact be coated steel, high tensile strength tool steel, stainless steel or carbide material. Additionally, it is desired that the precision ground ball contact have a diameter of between 0.040 inch and 2.00 inch.

The invention further comprises a lever 30 attached to the gage 2 as shown in FIG. 2 for adjusting the roll 15 to contact the measuring means, against a test part.

Figure 4:
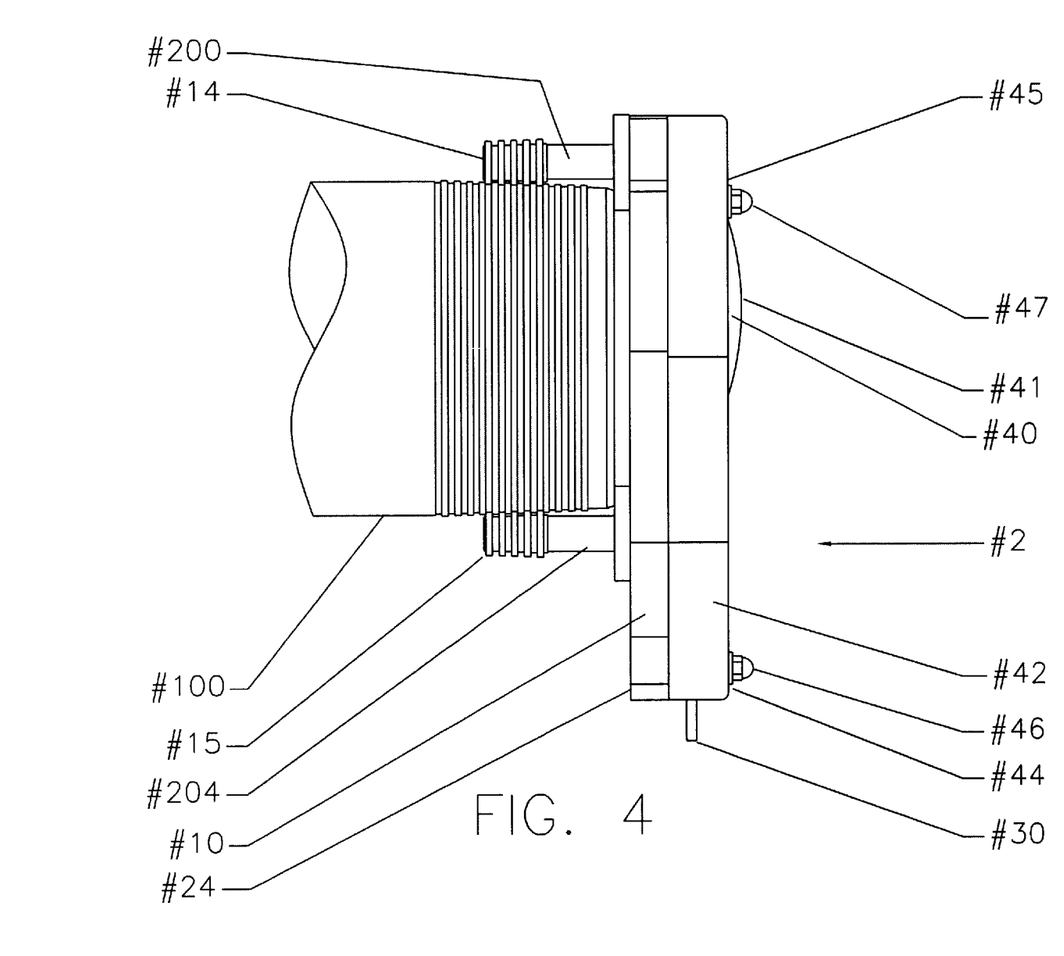
FIG. 4 is a side view of the gage with a part attached.

FIG. 4 shows a side view of gage 2 with part 100 engaged with the gage using rolls 14 and 15, which in this embodiment are grooved tapered rolls.

Figure 5:
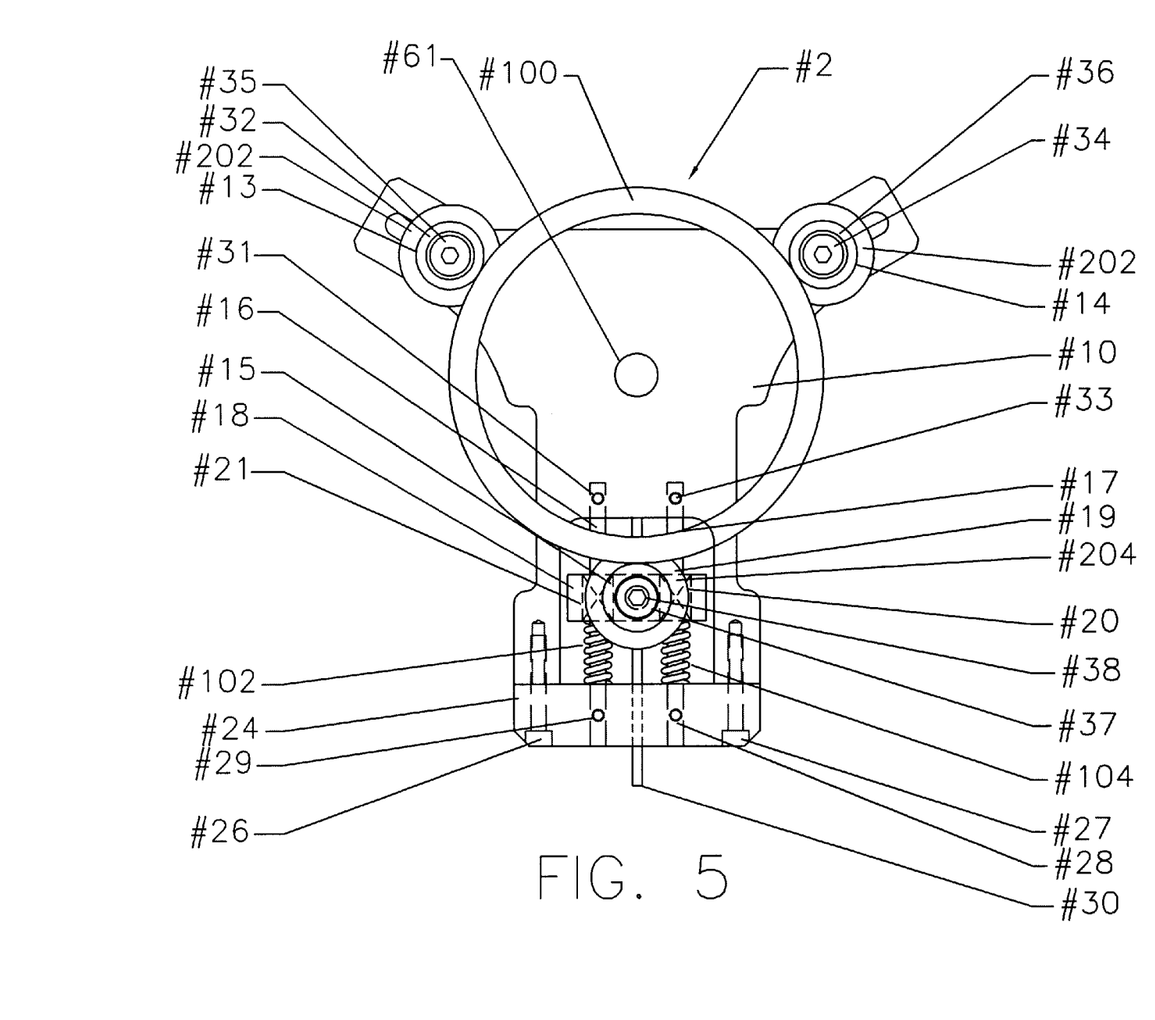
FIG. 5 is a bottom view of the gage with a part attached.

FIG. 5 shows a bottom view of product 100 engaged with the gage for measurement purposes. FIG. 5 depicts the preferred embodiment of the invention using two springs, 102 and 104. It is preferred that the springs 102 and 104 have a tensile strength of between 1 ft/lb and 100 ft/lb. In the most preferred embodiment, it is preferred that the springs 102 and 104 have a tensile strength of between 1 ft/lb and 100 ft/lb.

Figure 6:
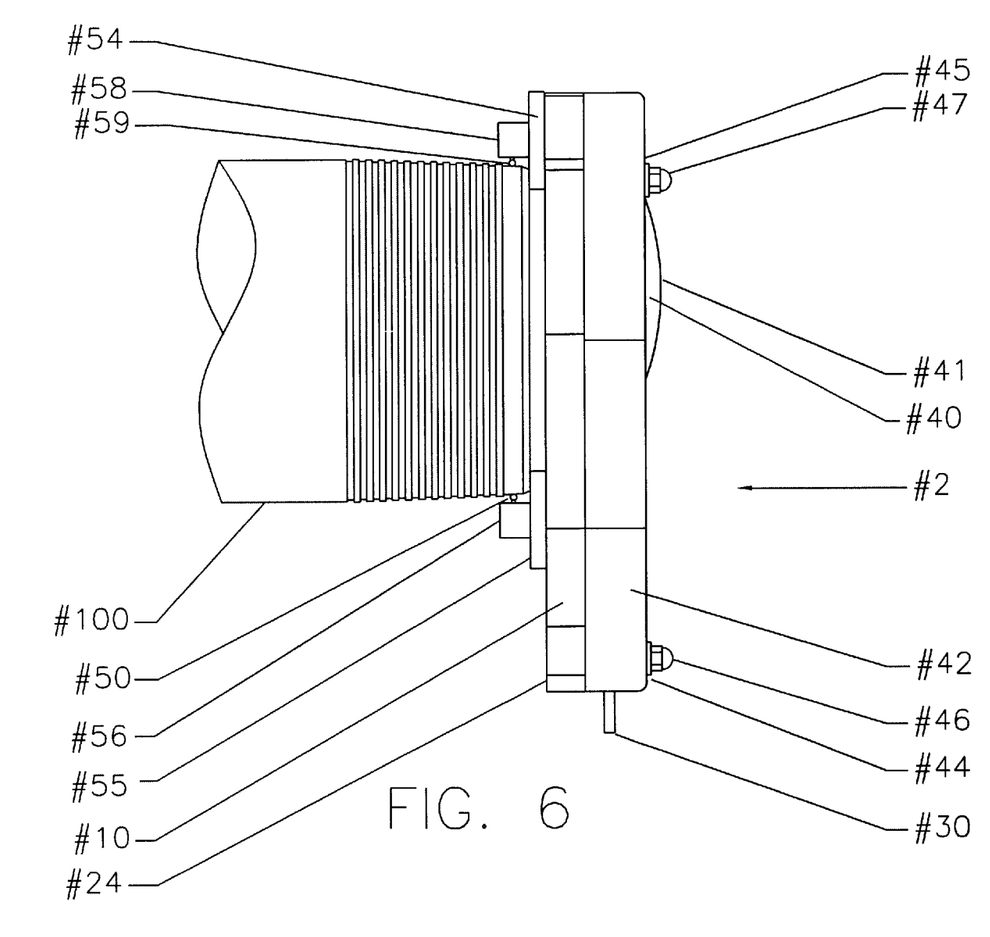
FIG. 6 is a side view of the gage with a part to measured attached to the gage using pin nose.

FIG. 6 shows a part 100 engaged with the novel gage 2 using fixedly adjustable pin nose spindles 58 and a measuring pin nose 56. The pin nose has a ball contact 50 and 59. Pin nose spindles 56 and 58 can have a two part construction with a base which is critically spaced for measuring. The bases 54 and 55 can be welded to spindles 56 and 58 respectively, or the two parts can be separate from each other, and yet intimately contacted. Alternatively, spindle 58 can be made in a one part construction.

Figure 7:
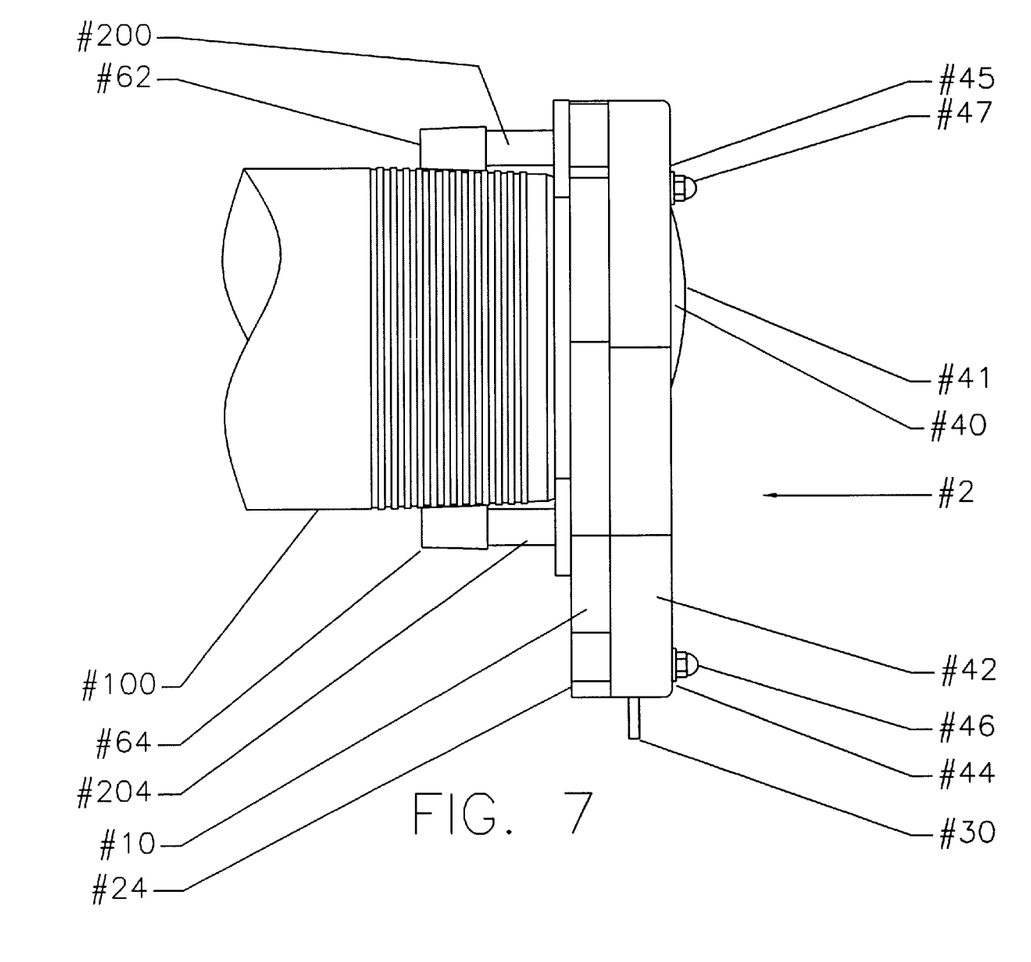
FIG. 7 is a side view of a gage with a part attached to the gage using "crest rolls", also known as smooth tapered rolls.

FIG. 7 shows part 100 engaged with the gage 2 using rolls which are known in the trade as "crest rolls" or smooth tapered rolls, 62 and 64.

Figure 8:
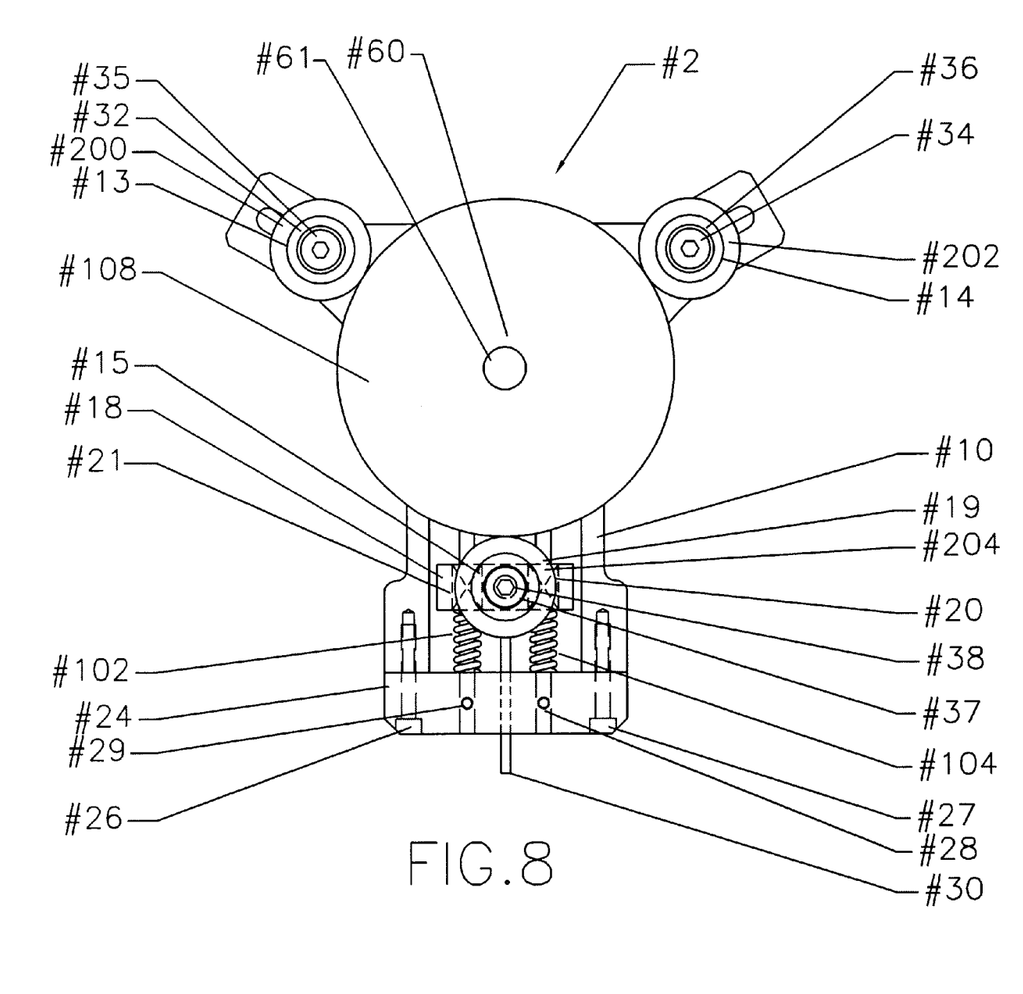
FIG. 8 is a bottom view of the gage with a setting standard attached.

FIG. 8 shows a bottom view of the gage 2 with setting standard 108 which shows gage base support 10 with removable spindles 202 and 204 and precision pin 61 acting as a set point to set the gage as a master. In the center of the gage, opening 60 is preferably ½ inch in diameter, containing a pin 61 acting as the set point of the gage.

Although not shown in great detail, linear bearings 20 are contemplated to be precision linear ball bearings. These bearings can be made from any number of hard materials, such as chrome plated metals, high tensile strength tool steel, stainless steel, or high impact polymers.

Figure 9:
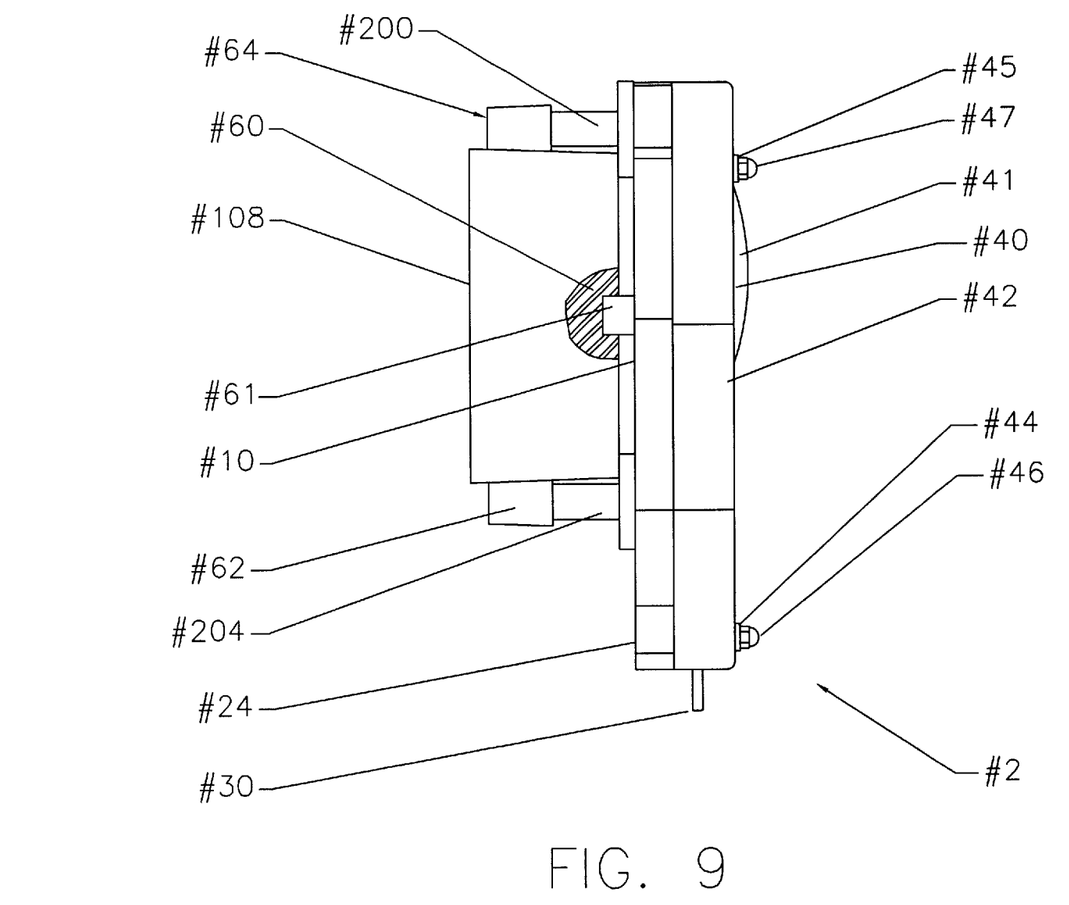
FIG. 9 is a side view of the gage with the setting standard.

FIG. 9 is a side view of the gage 2 with the gage setting standard 108. The figure shows an opening 60 with a pin 61 acting as a set point. The precision pin 61 sits on base 10. Base 10 is attached to housing 42 which includes an indicator 40 with a lens 41 disposed over the face of the indicator 40. The housing 42 is secured to the base with housing washer 44 and 45 and housing acorn nut 46 and 47. The gage 2 has crest rolls 62 and 64 which are mounted on spindles 200 and 204 and a third spindle not shown.

In addition, the present invention contemplates a system for measuring the inside or outside pitch diameter of a tapered threaded product using the grooved tapered roll embodiment of this gage, at a selected distance from the end of the product which comprises the steps of: setting a predetermined distance between three grooved measuring means on three spindles, positioning the gage over a reference master, measuring the reference master using the movable roll assembly to obtain a "zero" or base reading, removing the gage from the reference master, placing the gage over the part to be measured, measuring the part by engaging the measuring means against the part using the movable roll assembly, and viewing the deviation from the reference master measurement. This deviation can be used to measure lead, thread height and taper, which ultimately yields the Effective Diameter System of the product.

The first and best way to set-up and use the novel Effective Pitch Diameter is to use Reference (transfer) gages. These gages are made to a close tolerance, of known dimension and are held to within the manufactures specified tolerance after applying the Effective Diameter System, using the grooved tapered rolls or smooth crest rolls or using the pin nose spindles. It is possible to transfer these accurate dimensions from a known standard such as a reference master and now measure the deviation of the working part. Judgment can now be made, as to the accuracy of the dimensions of the working parts. This system is the best and most accurate way for measuring parts.

The second way to setup and use the novel Effective Diameter System is by measuring known length standards. The three rolls are spaced around an axis at 120 degrees forms a circle. Any round tapered product can be measured within this 120 degree spacing around the axis of working part, as an equilateral triangle. By using the dimension from working part drawings of finished working parts, calculations can be made as to the diameter of that is to measured on the pitch diameter or crest diameter or pin nose diameters. By knowing the diameter of the tapered grooved rolls or smooth tapered rolls or pin nose length dimension, a math calculation can be made as to the setting dimension that is required to form an equilateral triangle at the inscribe circle of measured part.

To setup the gage, a setting standard such as a reference master would be used and placed against the spindles between both fixed spindles. When the spindles are brought together they form a larger or smaller circle as their movement brings them closer or farther apart. A proper setting is when both spindles have a smooth firm fit between the setting standard and the spindle assemblies. The indicator must be zeroed while the setting standard is positioned between the fixed spindles and moveable spindle.

The Effective Diameter System can be applied to a working part and the inspector can now measure the deviation of the working part from the nominal position.

The third way to setup and use the Effective Diameter System is also by the use of known length standards. The diameter of the working part can be measured using a setting standard to measure from centerline 60 of the gage base to position the spindles.

In another embodiment, the present invention involves a system for measuring the inside or outside pitch diameter of a tapered smooth product at a selected distance from the end of the product by using the tapered smooth roll embodiment of the invention. This method comprises the steps of: setting a predetermined distance between three smooth measuring means on three spindles, positioning the gage over a reference master, measuring the reference master using the movable roll assembly to obtain a "zero" or base reading, removing the gage from the reference master, placing the gage over the part to be measured, measuring the part by engaging the measuring means against the part using the movable roll assembly, and viewing the deviation from the reference master measurement. This deviation can be used to determine taper, yielding the effective crest diameter of the product.

Still another embodiment of the present invention, involves a system for measuring the inside or outside pitch diameter of a smooth tapered unthreaded product at a selected distance from the end of the product using the pin nose embodiment of the invention comprising the steps of: setting a predetermined distance between three measuring means and three spindle surfaces known as reference gage surfaces by measuring the diameter of the product to be measured, setting the upper and lower thread contact surfaces at a predetermined vertical distance apart based on a specified diameter at the selected axial distance, placing the reference gage surface against the end of the product, bringing the ball contact into contact with the smooth tapered portion of the product pin nose, and measuring the pin nose, yielding the effective pin nose diameter of the product.

What is claimed is:

1. A dimensional gage for measuring inside and outside surfaces of an object, comprising:
   a gage base having a central axis;
   a first and second removable spindle attached to said gage base;
   a movable roll assembly attached with set screws to said gage base, said movable roll assembly comprising a third removable spindle, at least one guide rod, at least one spindle guide block positioned on the guide rod, at least two linear bearings supporting said guide block, at least one spring engaging the guide block, and at least one guide rod block attached to the gage base and providing a bearing surface for said spring;

measuring means attached to each of said first, second and third removable spindles and spaced around said central central axis with each measuring means being spaced equidistantly from the other measuring means around said central axis;

a lever for adjusting said movable roll assembly to engage said measuring means with a reference master, or a part to be measured;

a housing attached to said gage base; and an indicator disposed inside the housing attached to the gage base for indicating measurement of the reference master or part to be measured, wherein said measurement is selected from the group of measurements consisting of: pitch, lead and combinations thereof.

2. The gage of claim 1, wherein said measuring means are selected from the group consisting of grooved tapered rolls, smooth tapered rolls, and pin noses.

3. The gage of claim 2, wherein said grooved tapered rolls consist of three grooved tapered rolls and each are located in a different plane relative to each other and each is in a stepped planar relationship to a product lead, and wherein said grooved tapered rolls are attached to each of said removable spindles.

4. The gage of claim 2, wherein said smooth tapered rolls consist of three smooth tapered rolls and each are located on the same plane relative to each other, and wherein said smooth tapered rolls are attached to each of said removable spindles.

5. The gage of claim 2, wherein said pin noses consist of three pin nose mechanisms and all are disposed in the same plane relative to each other, and wherein said pin noses are attached to each of said removable spindles.

6. The gage of claim 2, wherein the grooved tapered rolls have a precision ground lead of between 1 pitch and 100 pitch, a height of between 0.001 inch and 1.000 inch, and a taper ranging from between 0.500 inch taper and 5.00 inch taper per foot.

7. The gage of claim 2, wherein said smooth tapered rolls have a precision ground taper ranging from between 0.500 inch taper and 5.00 inch taper per foot.

8. The gage of claim 2, wherein said pin noses have a precision ground ball contact of between 1 pitch and 100 pitch, and a stand off distance from said precision ground ball contact of between 0.010 inch to 10 inches.

9. The gage of claim 8, wherein the precision ground ball contact is coated steel, high tensile strength tool steel, stainless steel or carbide material.

10. The gage of claim 8, wherein the precision ground ball contact has a diameter of between 0.040 inch and 2.00 inches.

11. The gage of claim 1, wherein said guide rail block is rigidly attached to a gage base plate using guide block bolts.

12. The gage of claim 1, wherein the gage base is selected from the group of materials consisting of aluminum, brass, chrome plated metal, high tensile strength tool steel, steel, titanium composites, fiberglass, polymers having hard crystalline molecular structures, stainless steel, metal structures capable of sustaining severe impact, metal laminates and combinations thereof.

13. The gage of claim 1, wherein said indicator is selected from the group consisting of an analog indicator, a digital indicator, an electronic probe, a differential measuring instrument, an infrared transmitted gage and Data Collection/Logging System.

14. The gage of claim 1, wherein the housing further comprises a cover disposed over said indicator.

15. The gage of claim 14, wherein said cover is a lens.

16. The gage of claim 1, wherein said at least one spring has a tensile strength of between 1 ft/lb and 100 ft/lb.

17. The gage of claim 1, wherein said movable roll assembly further comprises an additional spring.

18. The gage of claim 1, where the linear bearings are precision linear ball bearings selected from the group of materials consisting of chrome plated metal, high tensile strength tool steel, stainless steel, high impact polymer and combinations thereof.

19. The gage of claim 1, wherein said measuring means are spaced equidistantly around said central axis, at intervals of 120 degrees to form an equilateral triangle.

20. The gage of claim 1, wherein said moveable roll assembly has a preloaded tension of between 1 ft/lb and 100 ft/lb and wherein said preloaded tension is applied equally against all surfaces of a part to be measured.

21. The gage of claim 1, wherein said gage comprises two guide rods.

22. The gage of claim 21, wherein said guide rods are selected from the group of materials consisting of: aluminum, brass, chrome plated metal, high tensile strength tool steel, high impact crystalline polymer, steel, stainless steel, titanium and laminates thereof.

* * * * *